Dec. 30, 1947.  R. F. ROGERS  2,433,709
POWER DRIVEN HAND CULTIVATOR
Filed Dec. 1, 1945  2 Sheets-Sheet 2
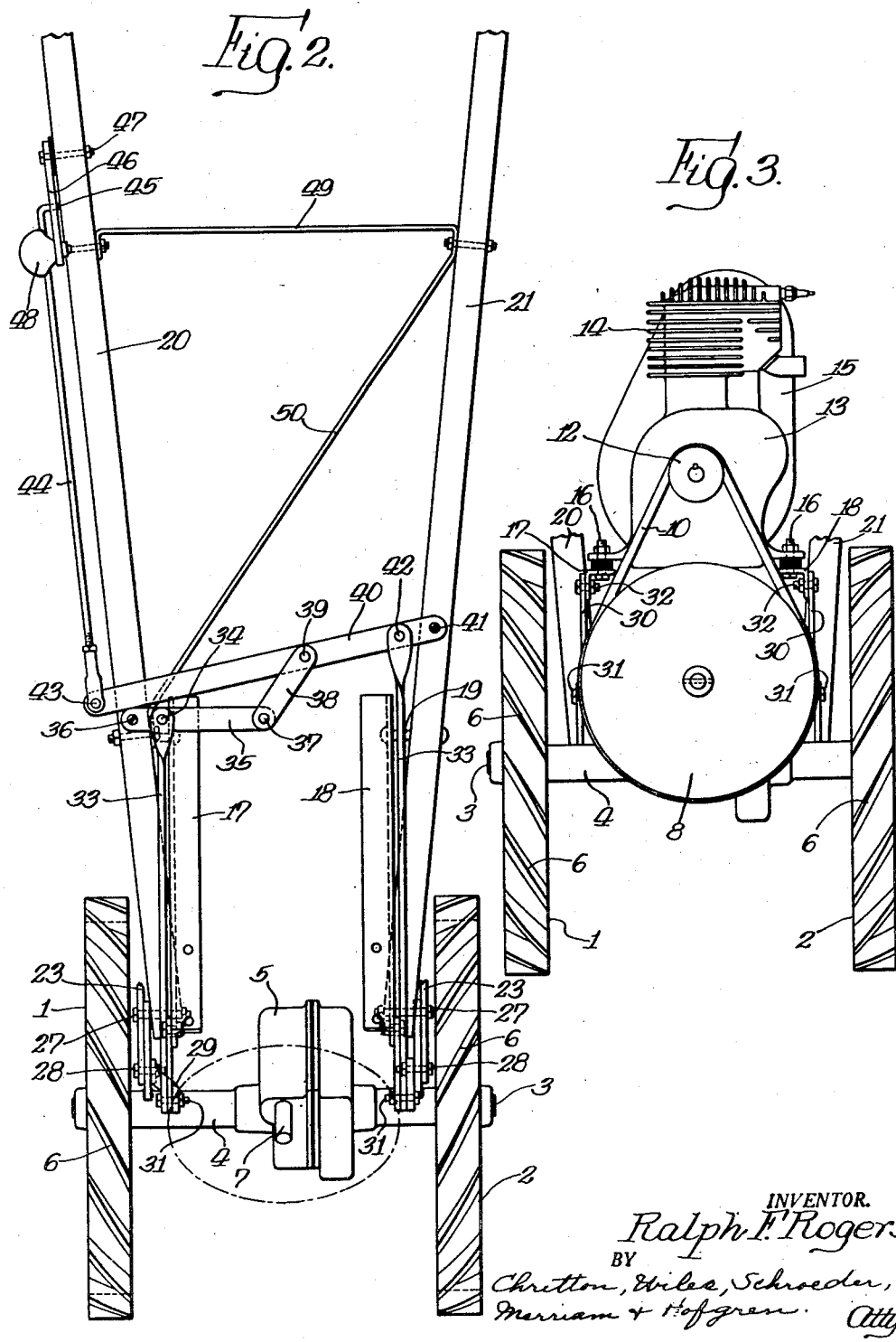

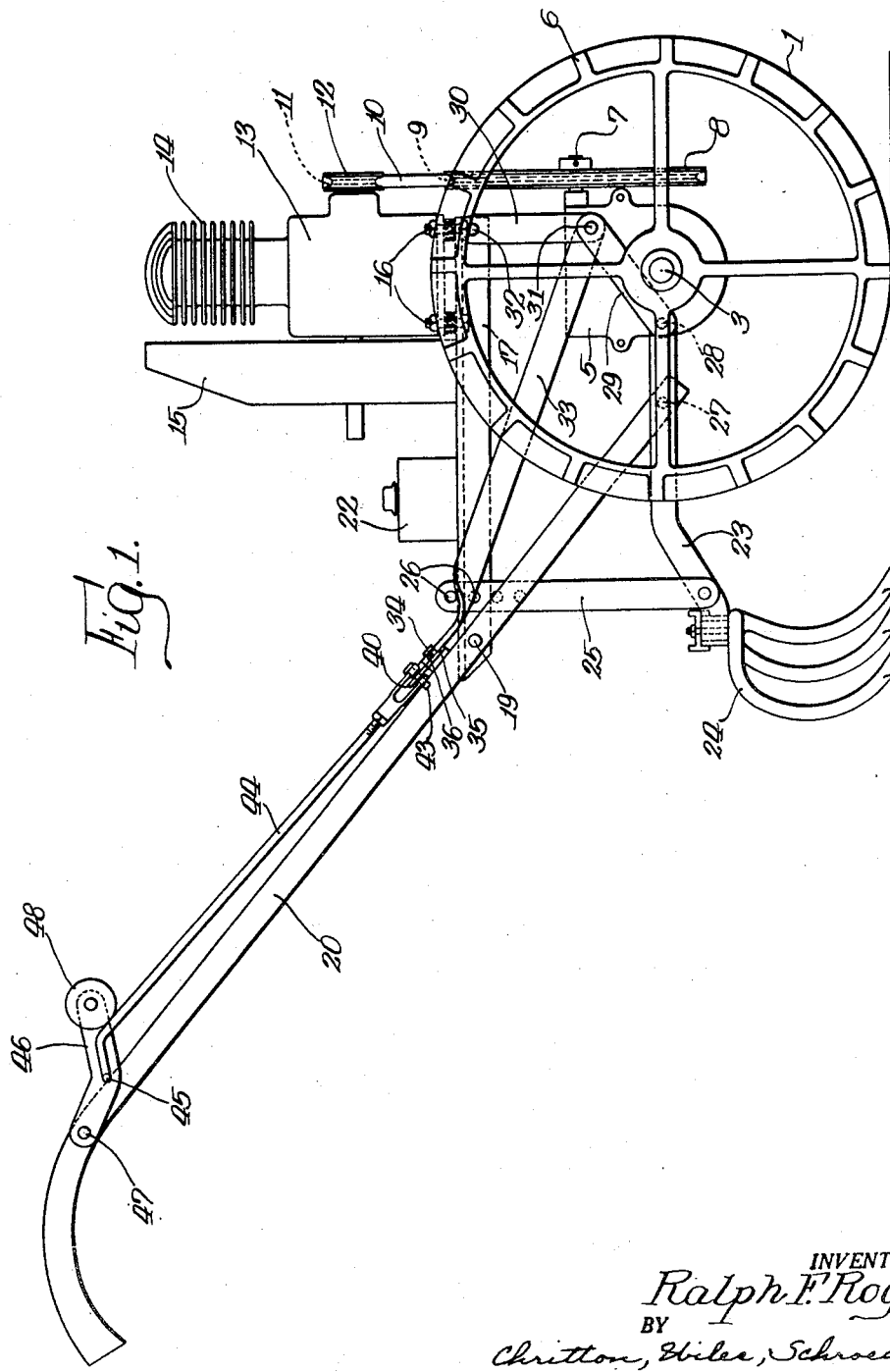

Patented Dec. 30, 1947

2,433,709

UNITED STATES PATENT OFFICE 2,433,709

POWER-DRIVEN HAND CULTIVATOR

Ralph F. Rogers, Burlington, Iowa

Application December 1, 1945, Serial No. 632,241

5 Claims. (Cl. 180—19)

This invention relates to a hand cultivator having a novel arrangement of power means for driving the cultivator along the ground and control means for quickly and easily starting and stopping the movement of the cultivator over the ground wherever desired.

Among the objects of my invention are: to provide a novel power driven hand cultivator; to produce a cultivator having power means so constructed and arranged as to effectively drive the traction wheels and in which the power means may be easily and quickly connected for driving the traction wheels and disconnected therefrom to stop the cultivator at the end of a row or other place desired and permit it to be turned by hand in position for operation in a different direction; to provide novel means located on one of the handles and instantly available for quick and easy operation for controlling the operation of the cultivator; to provide a power driven hand cultivator which can be operated by hand alone, or driven by power as desired; to provide a hand cultivator having a vertically adjustable engine which when elevated will drive the traction wheels, and when lowered will disconnect the power of the engine from the wheels; to provide novel means for raising and lowering the engine as desired; and such further objects, advantages and capabilities inherently possessed by my invention as will later more fully appear.

My invention further resides in the combination, construction and arrangement of parts illustrated in the accompanying drawings, and while I have shown therein for illustrative purposes only a preferred embodiment, I wish it understood that the same is susceptible of modification and change without departing from the spirit of my invention.

In the drawings:

Fig. 1 is a side elevation of a power driven hand cultivator embodying my invention.

Fig. 2 is a top plan view of the cultivator shown in Fig. 1, and omitting the engine, the engine platform and the belt and pulleys for the sake of clearness.

Fig. 3 is an end elevation of the hand cultivator shown in Fig. 1 with the handles partly broken away for convenience.

My power driven hand cultivator, in the form shown in the drawings, comprises a pair of traction wheels 1 and 2, fixedly mounted upon an axle 3, upon which axle is mounted an axle housing 4, within which housing the axle is rotatable. Fixed to the housing 4 is a gear casing 5, having therewithin a set of gearing (not shown) for driving the axle which in turn drives the traction wheels. Traction wheels 1 and 2 are provided with lugs 6 which are preferably set at an angle to the transverse width of the wheels so as to cause these wheels to have a better and more efficient gripping action with relation to the ground. Extending forwardly (toward the right as viewed in Fig. 1) from within the gear casing 5 is a shaft 7 for driving the gears in the gear casing. Fixed upon shaft 7 is a pulley 8 having a V-shaped notch 9, within which is positioned a V-shaped belt 10 seated within a similar V-shaped notch 11 in drive pulley 12 fixed to the drive shaft of the engine 13, which engine is preferably of the internal combustion type and having air cooling fins 14 for cooling the same. To assist in this cooling action there is provided a fan (not shown) within the housing 15, the engine and fan being of conventional form. The engine 13 is mounted upon the forward end of a platform by bolts or the like 16 passing through angle iron side bars 17 and 18, which at their rear end are pivotally mounted in any suitable manner, as for example by bolts or the like 19 to the handles 20, 21 so as to be swingably mounted with relation thereto as the front end of the platform and the engine are moved up and down in a manner hereinafter more fully described.

Mounted upon any suitable cross bar or other platform means extending between the side bars 17 and 18 is a fuel tank 22 for the engine. Extending rearwardly from each end portion of the axle housing 4 and swingably mounted with relation to the axle are a pair of cultivator tools supporting arms 23 having mounted on their rear ends in any suitable manner, any desired number of cultivating tools 24, these cultivating tools being of any desired shape and type used in the ordinary cultivation of the soil. Extending between the rear end portions of the supporting arms 23 and the rear end portion of the side bars 17 and 18 are a pair of arms 25, one on each side of the machine, which arms are each loosely bolted through holes 26 to the rear end portion of the side bars 17 and 18. A plurality of holes 26 are provided in the upper end of arm 25 so as to permit the cultivator tools to be raised or lowered by adjusting the bolts in any one of the openings 26, which bolts as stated also pass through the side bars 17 and 18. The cultivator handles 20 and 21 are at their lower ends pivotally mounted at 27 to the supporting arms 23. Adjustment of arms 25 with relation to the side bars 17 and 18 will also adjust the vertical position of the free ends of the handles. Pivotally mounted at 28 to the forward end portion of the tool supporting arms 23 is a link 29 forming part of a toggle joint for raising and lowering the engine. This toggle joint in addition to the link 29 also comprises link 30 pivoted at 31 to link 29, link 30 at its upper end being pivoted at 32 to the forward end of side bars 17 and 18. Also pivoted at 31 to the adjacent ends of links 29 and 30 is a rearwardly extending link 33.

While only one of these toggle joints is being described in detail it will be understood that there is one on each side of the cultivator for raising and lowering the engine at the forward end of the platform. Referring to Fig. 2 the rear end of left hand link 33 is pivoted at 34 to a link 35 which at its left hand end is pivoted at 36 to handle 21 and at its other end is pivoted at 37 to a short link 38, which short link at its opposite end is pivoted at 39 to the lever 40, which at its right hand end as viewed in Fig. 2 is pivoted at 41 to the handle 21. The rear end of the right hand link 33 is pivoted at 42 to lever 40. Lever 40 at its left hand end, as viewed in Fig. 2, is pivoted at 43 to connecting rod 44, which at its opposite end is pivoted at 45 to a control lever 46 (see Fig. 1), which control lever at its rear end is pivoted at 47 to handle 20 near its rear end. Mounted upon the front end of control lever 46 is a handle 48.

From the above structure it will be understood that when the operator of the cultivator wishes to disconnect the driving power of the engine from the traction wheels, or connects its power therebetween, this may be done by simply moving the handle 48 to the desired position. In Fig. 1 the control handle 48, the toggle members, and associate parts are in position to disconnect the power of the engine from the traction wheels and thus enable the cultivator to remain stationary or be turned or moved as desired by hand. In order to connect the power of the engine to the traction wheels for driving the cultivator by power, all that is necessary is for the operator to grasp the handle 48 and swing control lever 46 to the rear which will move each of links 33 rearwardly and the pivot 31 rearwardly which will tend to straighten toggle links 29 and 30 sufficiently to elevate the engine and tighten the belt 10, which in turn will drive the pulley 8 and through the intermediate gears and axle will drive the traction wheels. In other words, swinging the control handle 48 forwardly to the position shown in Fig. 1 will disconnect the engine from the traction wheels because of lowering of the front end of the platform upon which the engine is mounted, due to the forward movement as viewed in Fig. 1 of the pivot 31 and partially collapsing the toggle members. By swinging the control handle 48 and control lever 46 rearwardly of the handle 20 the reverse movement of the two toggle members will operate to elevate the forward end of the platform upon which the engine is mounted and tighten belt 10 to connect the power of the engine to the traction wheels. The various links and levers described above, and as shown in Fig. 2, are so proportioned as to give the proper proportional movement to these parts to cause the two toggle members simultaneously to raise and lower equal amounts as the control lever 46 is operated. This will prevent the platform upon which the engine is mounted from twisting and will cause it to raise and lower the engine in a substantially even manner.

From the above construction it will be seen that I have provided a hand cultivator with traction wheels that may be selectively connected or disconnected to the power of the engine to enable the power to be disconnected from the wheels at the end of a row so that the cultivator may be turned by hand and start along another row. By this construction the cultivator may be operated by hand whenever desired, and driven by power when desired. As will be understood, raising and lowering of the free end of the handles will cause the lower ends of the cultivator tools to enter the ground at greater or less depths as may be required to meet the various requirements of cultivating. The handles 20 and 21 will be suitably braced with relation to each other by the rigid brace members 49 and 50 connected therebetween as shown in Fig. 2.

I claim:

1. A power driven hand cultivator comprising, a pair of traction wheels, an axle upon which said wheels are mounted, an axle housing, a gear casing on said housing and having gearing for driving the axle and wheels and a pulley for driving the gearing, a pair of handles, an engine platform swingably mounted on the handles, an engine on the platform, said engine having a driving pulley, a belt between said two pulleys, and means for raising and lowering the engine to tighten and loosen the belt for connecting and disconnecting the engine power to and from the traction wheels.

2. A power driven hand cultivator comprising, a pair of traction wheels, an axle upon which said wheels are mounted, an axle housing, a gear casing on said housing and having gearing for driving the axle and wheels and a pulley for driving the gearing, a pair of handles, an engine platform swingably mounted on the handles, an engine on the platform, said engine having a driving pulley, a belt between said two pulleys, and means for raising and lowering the engine to tighten and loosen the belt for connecting and disconnecting the engine power to and from the traction wheels, said means comprising angularly connected links.

3. A power driven hand cultivator comprising, a pair of traction wheels, an axle upon which said wheels are mounted, an axle housing, a gear casing on said housing and having gearing for driving the axle and wheels and a pulley for driving the gearing, a pair of handles, an engine platform swingably mounted on the handles, an engine on the platform, said engine having a driving pulley, a belt between said two pulleys, means for raising and lowering the engine to tighten and loosen the belt for connecting and disconnecting the engine power to and from the traction wheels, said means comprising angularly connected links, and a longitudinally movable bar for changing the angularity of said links.

4. A power driven hand cultivator comprising, a pair of traction wheels, an axle upon which said wheels are mounted, an axle housing, a gear casing on said housing and having gearing for driving the axle and wheels and a pulley for driving the gearing, a pair of handles, an engine platform swingably mounted on the handles, an engine on the platform, said engine having a driving pulley, a belt between said two pulleys, means for raising and lowering the engine to tighten and loosen the belt for connecting and disconnecting the engine power to and from the traction wheels, said means comprising angularly connected links, a longitudinally movable bar for changing the angularity of said links, and a control device on one of said handles for selectively moving said bar.

5. A power driven hand cultivator comprising, a pair of traction wheels, an axle upon which the wheels are mounted, an axle housing, a gear casing on said housing and having gearing for driving the axle and wheels and a pulley for driving the gearing, a pair of handles, an engine platform swingably mounted on the handles, an engine on the platform, said engine having a driving pulley, a belt between said pulleys, a pair of toggle joints each connected with the axle housing and the engine platform one on each side, said toggle joints each having a longitudinally movable bar, a control lever on one of said handles, and connections between said control lever and each of said bars for simultaneously moving the toggle joints for raising and lowering the engine for selectively tightening and loosening said belt to connect and disconnect the engine power to and from the traction wheels.

RALPH F. ROGERS.

REFERENCES CITED

The following references are of record in the file of this patent:

UNITED STATES PATENTS

| Number | Name | Date |
|---|---|---|
| 2,082,600 | Squires et al. | June 1, 1937 |
| 1,124,162 | Monaham | Jan. 5, 1915 |
| 1,641,158 | Donald | Sept. 6, 1927 |